June 15, 1965   J. W. BORGER ETAL   3,189,388
HOPPER CAR AND HOPPER UNLOADING DEVICES THEREFOR
Filed Sept. 11, 1961   15 Sheets-Sheet 1
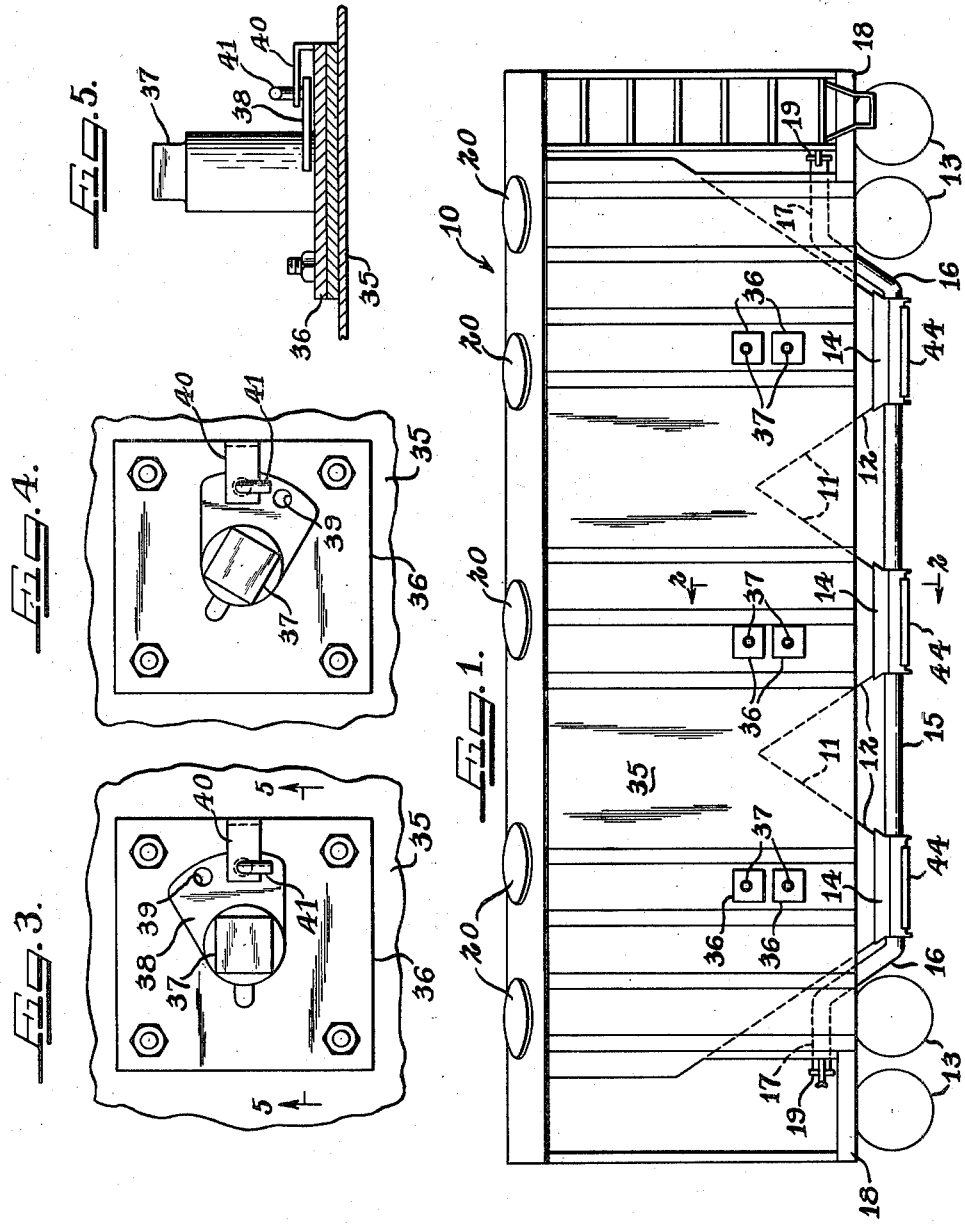
INVENTORS
JACK W. BORGER
FRANK A. VANDER LINDEN
RICHARD J. GREEN
by Cromwell, Greist & Warden
ATTYS.

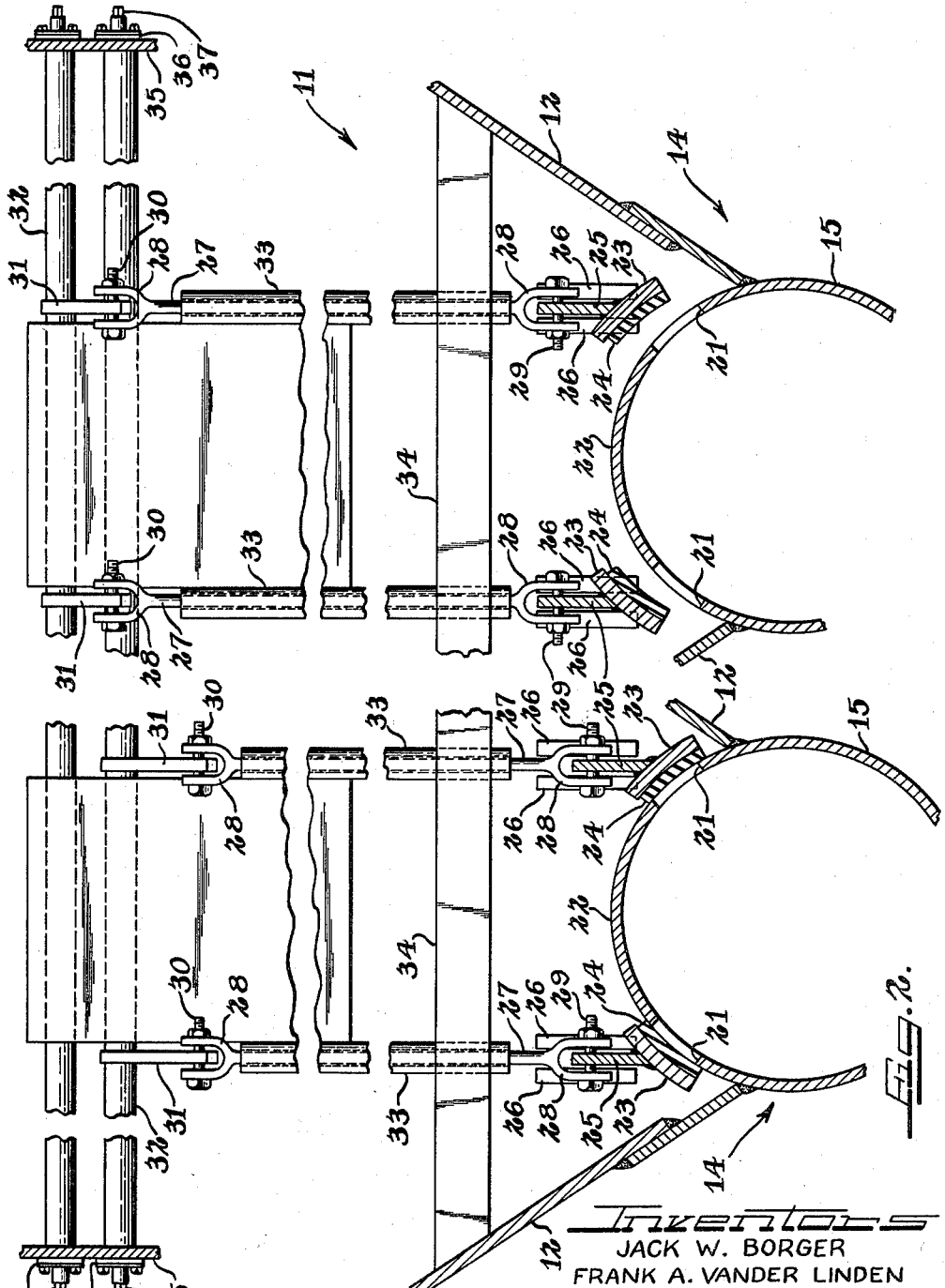

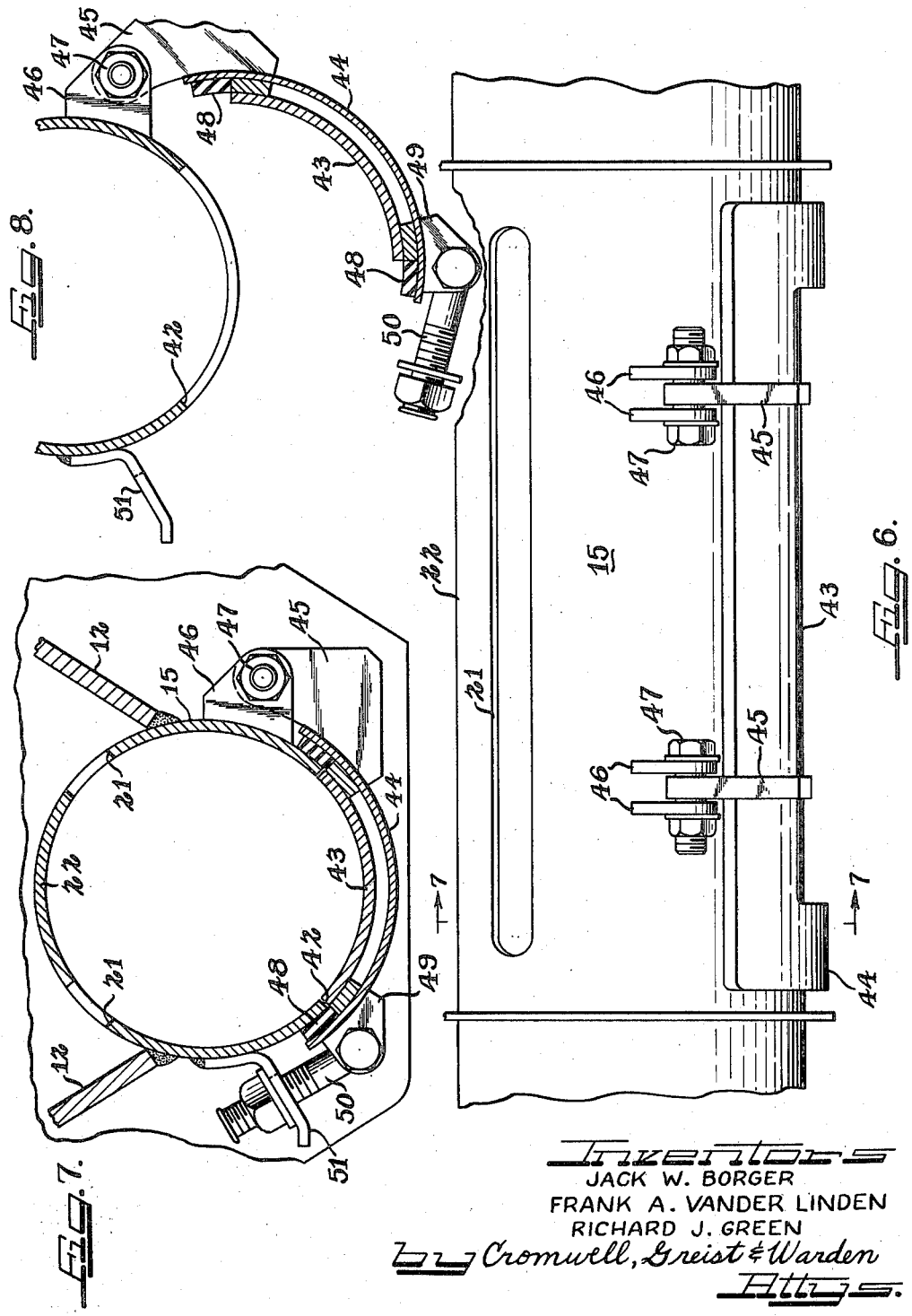

June 15, 1965  J. W. BORGER ETAL  3,189,388
HOPPER CAR AND HOPPER UNLOADING DEVICES THEREFOR
Filed Sept. 11, 1961  15 Sheets-Sheet 4

INVENTORS
JACK W. BORGER
FRANK A. VANDER LINDEN
RICHARD J. GREEN

BY Cromwell, Greist & Warden
ATTYS.

June 15, 1965  J. W. BORGER ETAL  3,189,388
HOPPER CAR AND HOPPER UNLOADING DEVICES THEREFOR
Filed Sept. 11, 1961  15 Sheets-Sheet 5
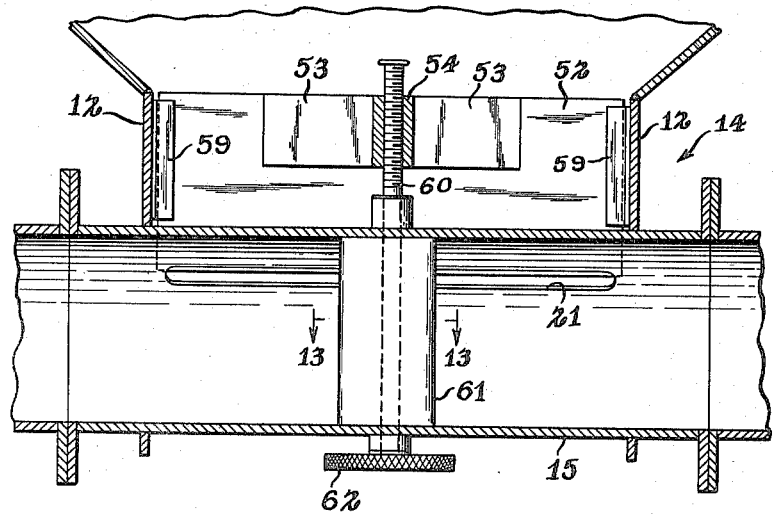
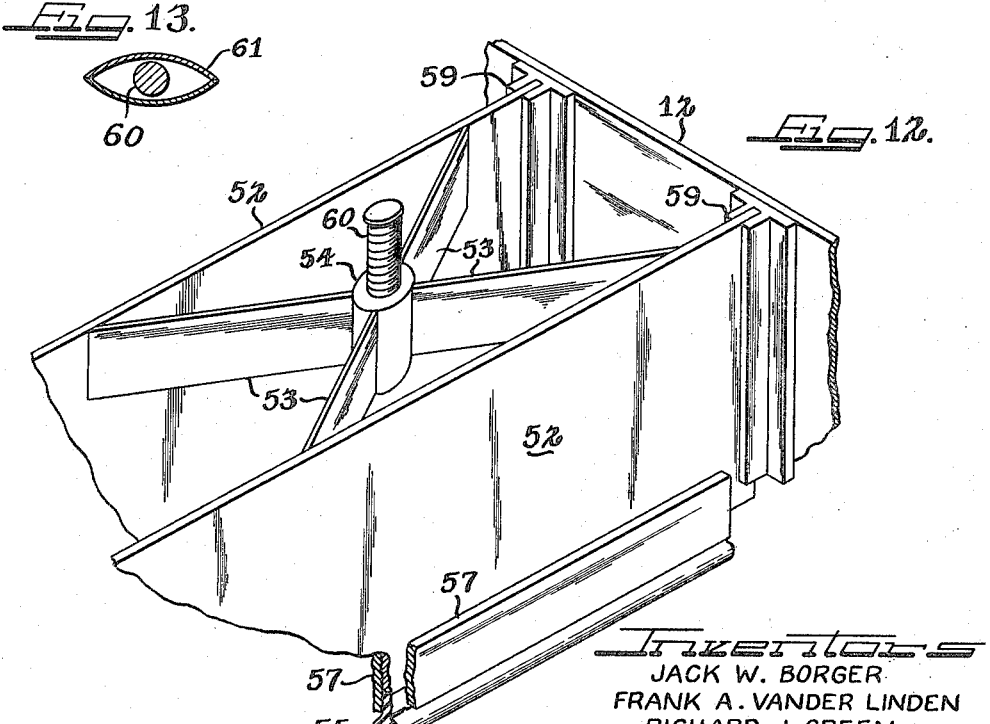
INVENTORS
JACK W. BORGER
FRANK A. VANDER LINDEN
RICHARD J. GREEN
by Cromwell, Greist & Warden
Attys.

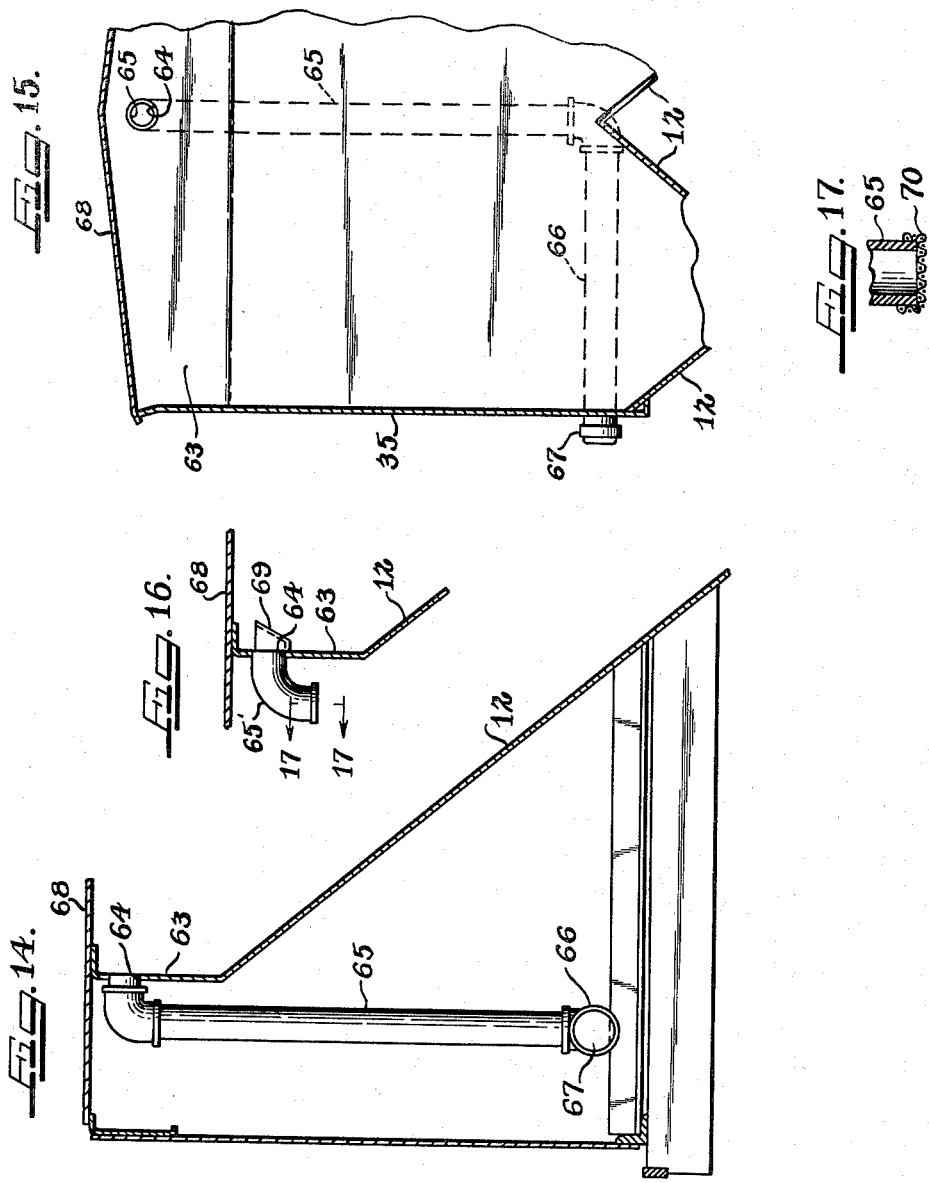

June 15, 1965 J. W. BORGER ETAL 3,189,388
HOPPER CAR AND HOPPER UNLOADING DEVICES THEREFOR
Filed Sept. 11, 1961 15 Sheets-Sheet 7
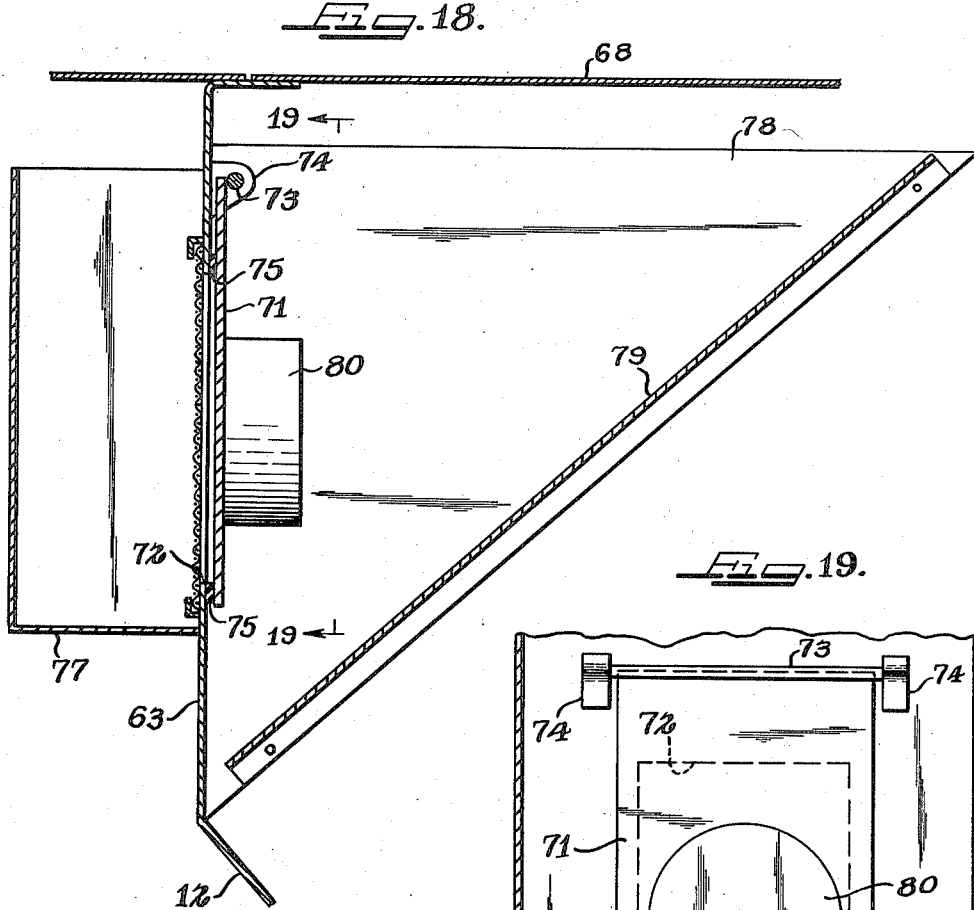
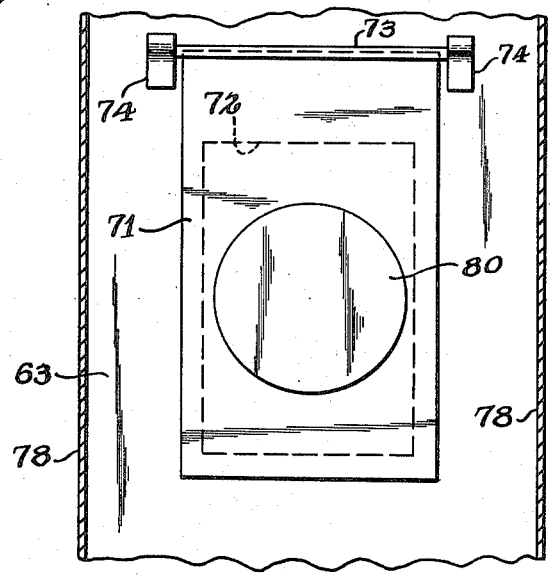
INVENTORS
JACK W. BORGER
FRANK A. VANDER LINDEN
RICHARD J. GREEN
by Cromwell, Greist & Warden
Attys.

June 15, 1965  J. W. BORGER ETAL  3,189,388
HOPPER CAR AND HOPPER UNLOADING DEVICES THEREFOR
Filed Sept. 11, 1961  15 Sheets-Sheet 8

INVENTORS
JACK W. BORGER
FRANK A. VANDER LINDEN
RICHARD J. GREEN
by Cromwell, Greist & Warden
Attys.

June 15, 1965   J. W. BORGER ETAL   3,189,388
HOPPER CAR AND HOPPER UNLOADING DEVICES THEREFOR
Filed Sept. 11, 1961   15 Sheets-Sheet 9
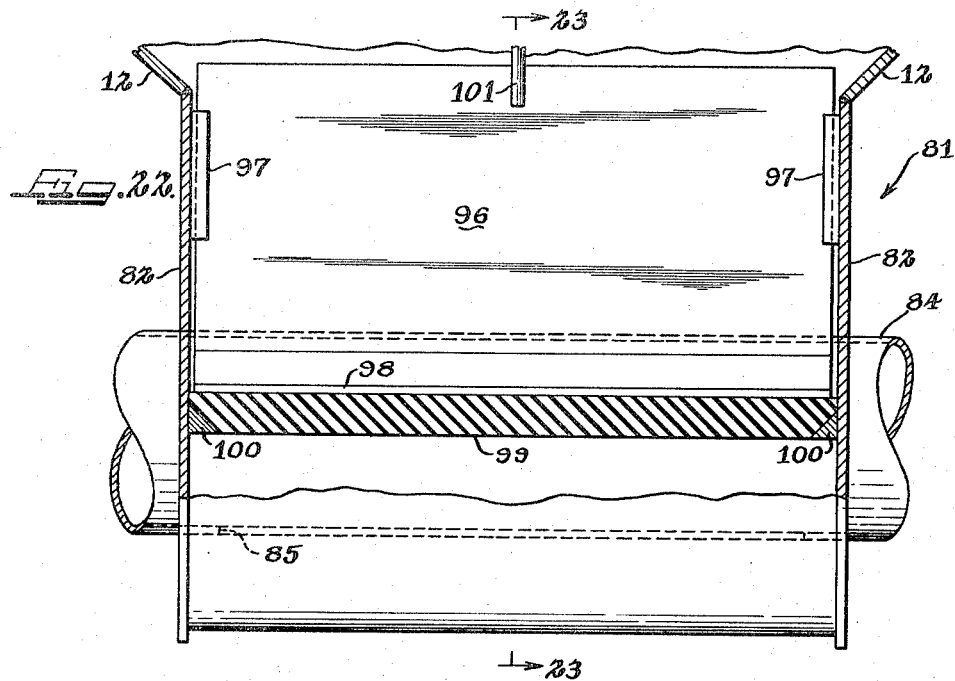
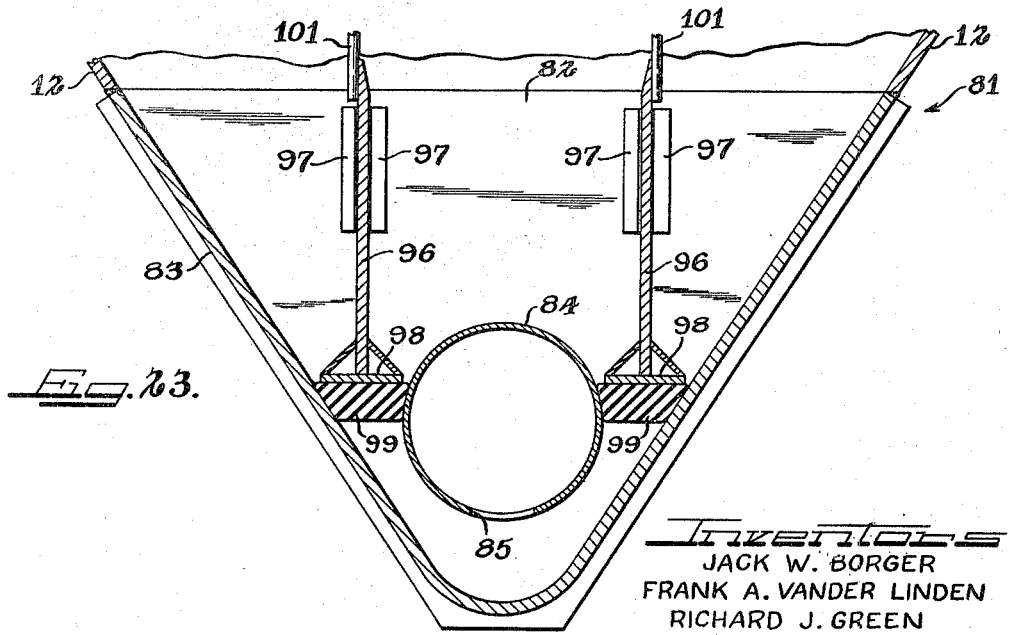
INVENTORS
JACK W. BORGER
FRANK A. VANDER LINDEN
RICHARD J. GREEN
BY Cromwell, Greist & Warden
ATTYS.

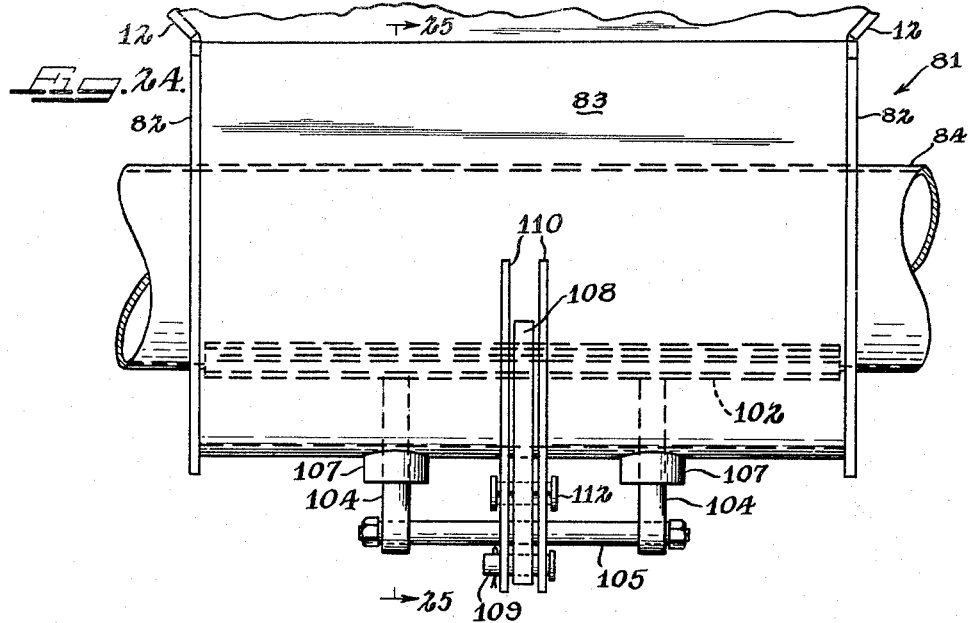
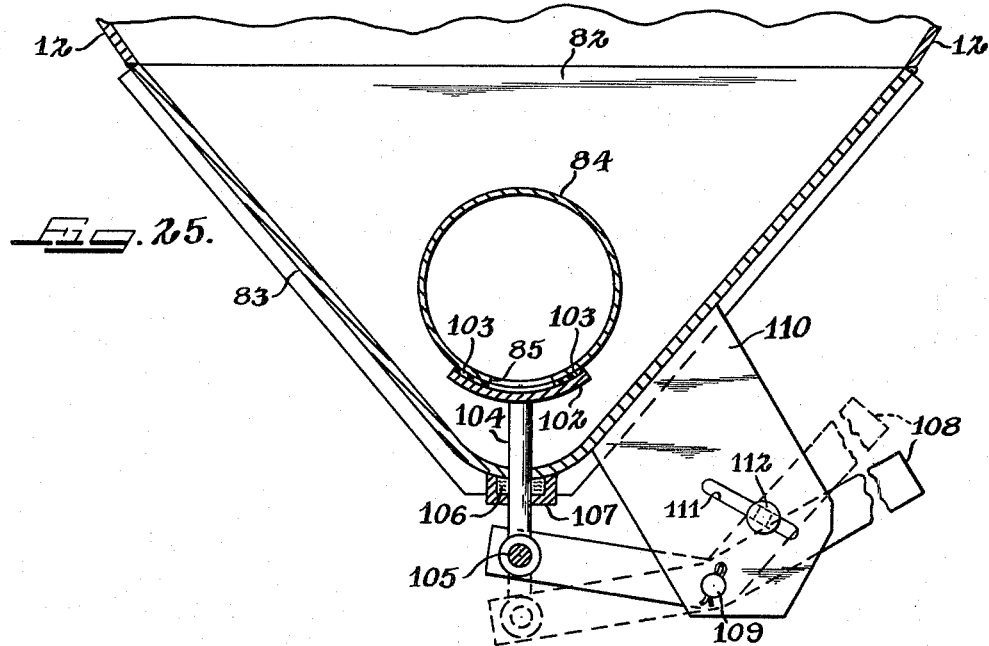

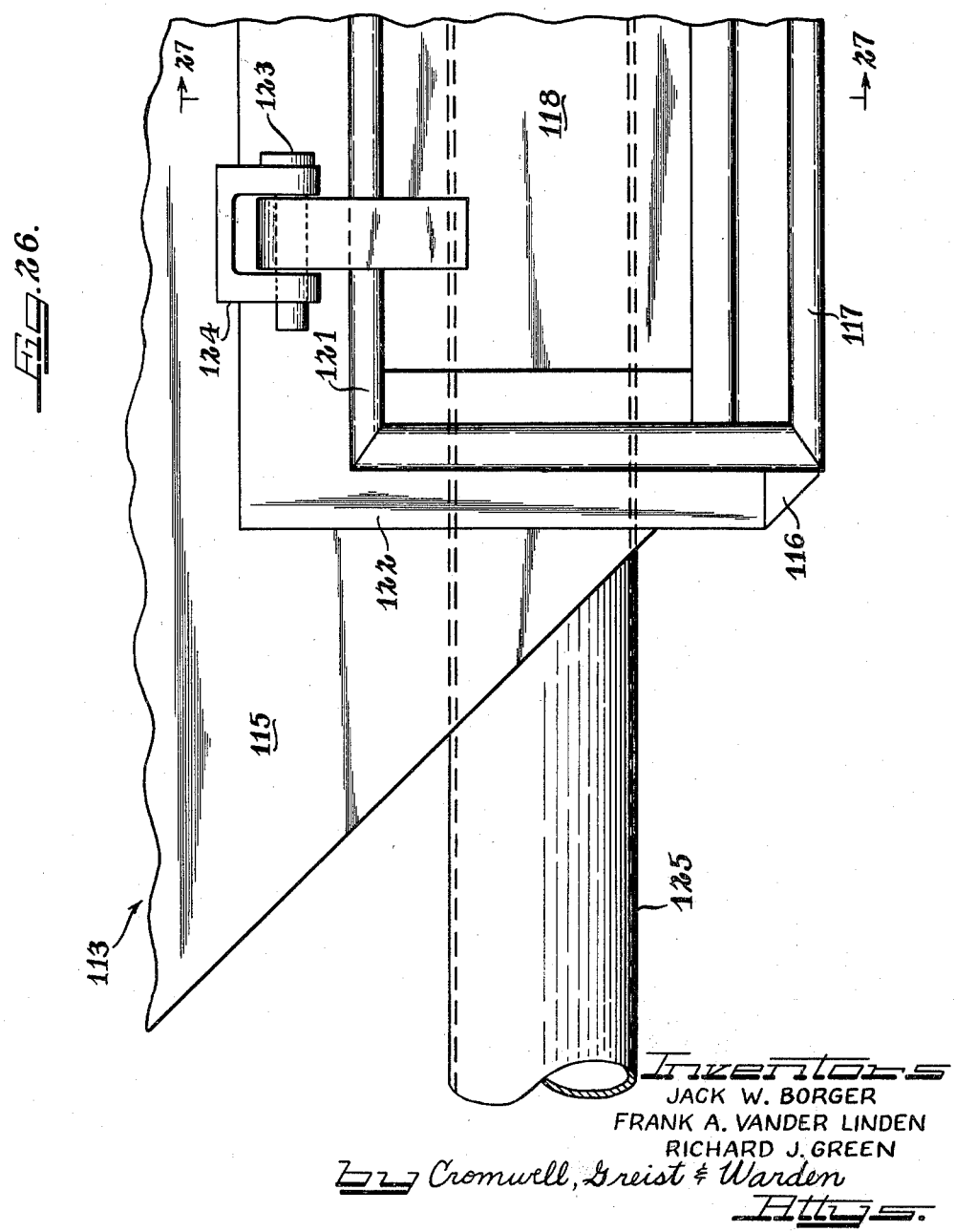

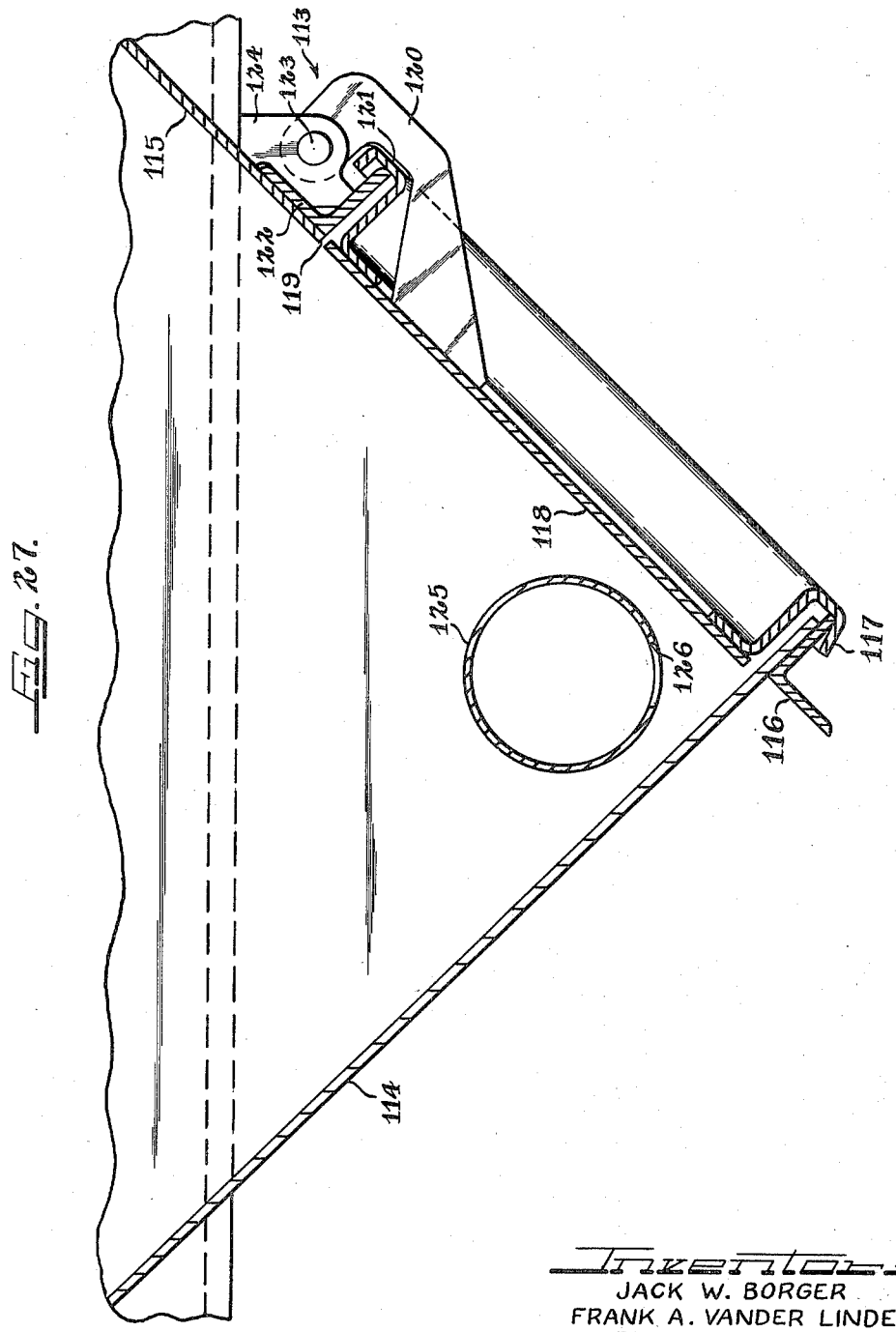

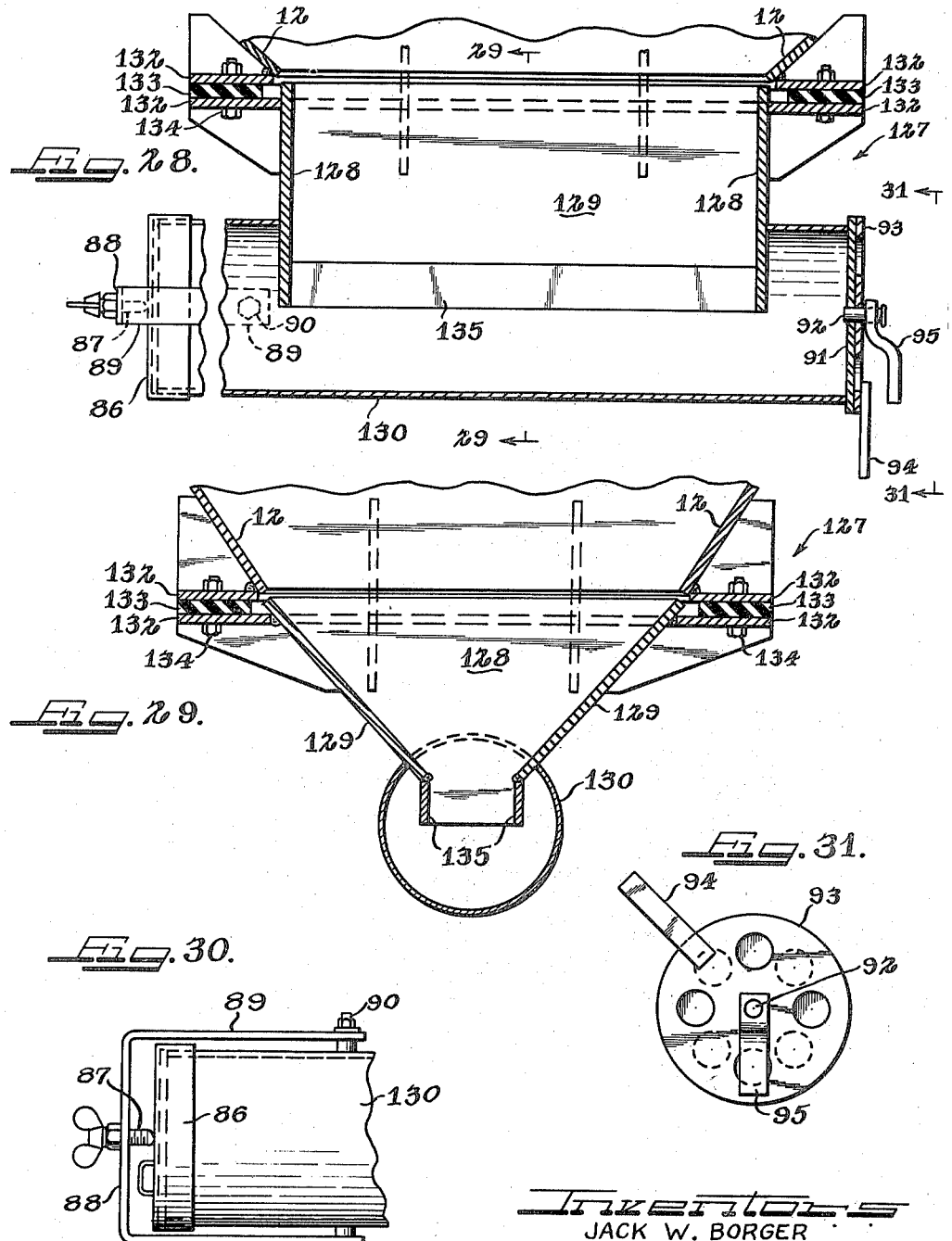

June 15, 1965  J. W. BORGER ETAL  3,189,388
HOPPER CAR AND HOPPER UNLOADING DEVICES THEREFOR
Filed Sept. 11, 1961  15 Sheets-Sheet 14

INVENTORS
JACK W. BORGER
FRANK A. VANDER LINDEN
RICHARD J. GREEN
by Cromwell, Greist & Warden
Attys.

United States Patent Office 3,189,388
Patented June 15, 1965

3,189,388
HOPPER CAR AND HOPPER UNLOADING
DEVICES THEREFOR
Jack W. Borger, Calumet City, and Frank A. Vander
Linden, Chicago, Ill., and Richard J. Green, Butler, Pa.,
assignors to Pullman Incorporated, Chicago, Ill., a corporation of Delaware
Filed Sept. 11, 1961, Ser. No. 137,328
10 Claims. (Cl. 302—52)

The present invention relates to new and improved systems and devices for use in the pneumatic unloading of particulate material from hoppers and hopper cars. More specifically, the invention is directed to new and improved hopper unloading arrangements adapted for pneumatic operation, the arrangements involving the use of specially designed conduit means extending across the discharge portion of a hopper and being in communication with the interior of the hopper to receive material therefrom, special air supply and venting means also being provided for efficient pneumatic unloading operation in an uncomplicated structural environment.

The basic hopper car design involves the use of overhead hatches which are uncovered to permit the introduction of air into the hoppers of the car during individual hopper bottom unloading through gravity discharge gating arrangements. Design improvements have resulted in the introduction of a pneumatic unloading arrangement for each hopper, such an arrangement generally involving the use of a suction hose attachment at the discharge end of each hopper, a sliding gate member controlling the flow of material from the hopper, separate air introduction means to supply air to the area of delivery of the material into the pneumatic discharge connection, and open hatch operation. This arrangement is of generally complicated design and structure and is time consuming in operation. Complexities in material discharge structural arrangements tend to cause damage to the material being unloaded and open hatch operation can result in material contamination. The number of car seals required increases the labor required during loading and unloading of the car and also encourages pilfering.

It is an object of the present invention to provide a new and improved hopper structure and hopper car material unloading system of uncomplicated design and arrangement and capable of efficient pneumatic operational use with minimal material damage and contamination.

A further object is to provide a new and improved hopper car and hopper unloading devices therefor involving the advantages of a completely closed system impervious to dirt, rain, snow, etc., universal end unloading with the car being adapted for unloading from either or both ends thereof, and economies in fabrication and operation.

Another object is to provide a new and improved hopper including as a part thereof a special material discharge conduit means which extends across the discharge portion of the hopper in communication therewith and includes specially designed and efficiently operating valve means located in the hopper and operatively engaging the conduit means to control material discharge from the hopper.

Still a further object is to provide a new and improved hopper including a specially designed material discharge means in association with the discharge end of the hopper, the discharge means including conduit means extending in communication with the hopper and functioning to pick up material therefrom upon pneumatic operation for efficient material discharge from the hopper.

A further object is to provide a new and improved hopper including as a part thereof a semi-cylindrical material discharge conduit means extending across the bottom of the hopper and attached along its upper free edge portion to the bottom of the hopper to define the bottom wall portion thereof, the discharge means further including baffle means providing an air space for pneumatic discharge of material from the hopper.

Further objects not specifically set forth will become apparent from the following detailed description of the present invention made in conjunction with the accompanying drawings wherein:

FIG. 1 is a schematic side elevation of the improved hopper car of the invention generally illustrating the preferred pneumatic discharge end unloading system;

FIG. 2 is an enlarged fragmentary section of a portion of the car of FIG. 1 taken generally along line 2—2 therein and illustrating a special hopper discharge end construction forming a part of the invention;

FIG. 3 is an enlarged fragmentary end view of one of the exposed operating means forming a part of the valving arrangement of the hopper discharge end structure of FIG. 2;

FIG. 4 is a view similar to FIG. 3 illustrating operational use of the operating means;

FIG. 5 is a fragmentary section of the operating means of FIG. 3 as viewed generally along line 5—5 therein;

FIG. 6 is an enlarged fragmentary elevation of one of the conduit means of FIG. 2;

FIG. 7 is a fragmentary section of the conduit means of FIG. 6 taken generally along line 7—7 therein;

FIG. 8 is a view similar to FIG. 7 illustrating operational use of the conduit means during material gravity discharge therefrom;

FIG. 11 is a transverse section on reduced scale of the arrangement of FIG. 9 as viewed generally along line 11—11 therein;

FIG. 12 is a fragmentary perspective of the modified valving means;

FIG. 13 is a transverse section of an operating element of the valving means taken generally along line 13—13 in FIG. 11;

FIG. 14 is a partly sectioned, fragmentary elevation of one form of vent means for use with the hopper structure of the present invention;

FIG. 15 is a fragmentary, partly sectioned elevation taken at right angles to the view of FIG. 14;

FIG. 16 is a fragmentary view of a modified form of vent means;

FIG. 17 is an enlarged fragmentary section of a portion of the vent means of FIG. 16 as viewed generally along line 17—17 therein;

FIG. 18 is a partly sectioned, fragmentary elevation of another form of vent means;

FIG. 19 is a fragmentary elevation of a portion of the vent means of FIG. 18 as viewed generally along line 19—19 therein;

FIG. 22 is a fragmentary longitudinal section of still another form of hopper discharge device forming a part of the invention;

FIG. 23 is a fragmentary transverse section of the device of FIG. 22 as viewed generally along line 23—23 therein;

FIG. 24 is a fragmentary elevation of still another form of hopper discharge device;

FIG. 25 is a fragmentary transverse section of the device of FIG. 24 as viewed generally along line 25—25 therein;

FIG. 26 is a fragmentary elevation of a further modification of hopper discharge device;

FIG. 27 is a fragmentary transverse section of the device of FIG. 26 taken generally along line 27—27 therein;

FIG. 28 is a fragmentary longitudinal section of still another modified hopper discharge device;

FIG. 29 is a fragmentary transverse section of the device of FIG. 28 as viewed generally along line 29—29 therein;

FIG. 30 is a fragmentary elevation of a closure arrangement forming a part of the device of FIG. 28;

FIG. 31 is an end elevation of air vent means as viewed generally along line 31—31 in FIG. 28;

Figure 10:
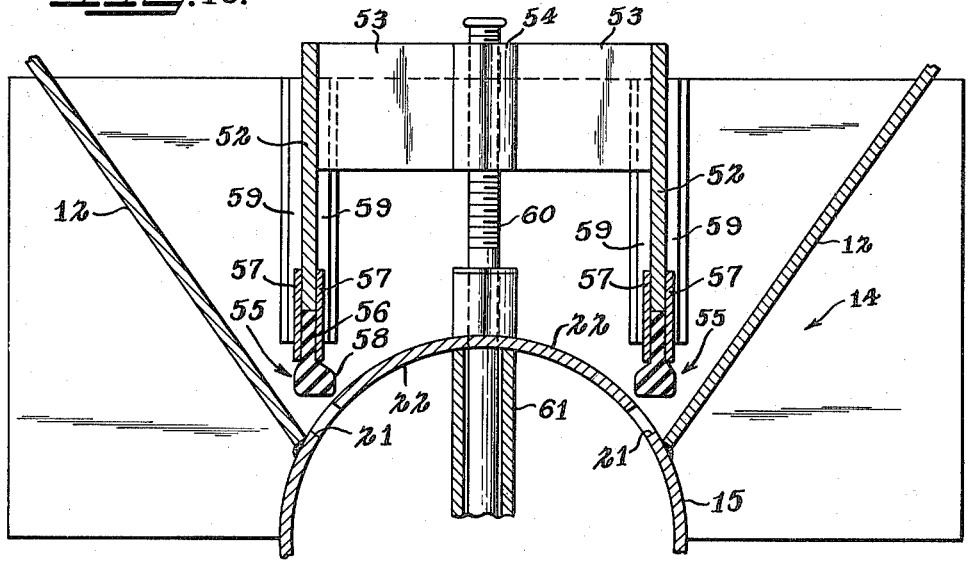
FIG. 10 is a view similar to FIG. 9 illustrating operational use of the valving means.

FIG. 1 illustrates a hopper car 10 provided with a plurality of longitudinally aligned material storage hoppers 11 with each hopper being formed with a bottom material discharge portion 12 defined by converging wall sections and projecting downwardly below the main car body structure between the spaced wheel trucks, the locations of which are designated by the schematically illustrated wheels 13. The hopper car 10 is of basically conventional design including in the main body portion thereof a series of longitudinally aligned hoppers 11 positioned along one side of the car as viewed in FIG. 1, and a similar series of longitudinally aligned hoppers positioned along the opposite side of the car 10 and not observable in FIG. 1. Transversely of the car 10, the longitudinally aligned hoppers are in side-by-side relation as is conventional and for purposes of describing certain aspects of the present invention; the illustrations are limited to one series of longitudinally aligned hoppers 11.

The bottom material discharge portion 12 of each hopper 11 has attached thereto a special hopper discharge device 14 which forms a part of a material discharge conveyance system extending continuously between and interconnecting the discharge portions of the longitudinally aligned hoppers 11. This system includes a continuous cylindrical conduit 15 which is of uniform diameter throughout. Spaced portions of the conduit 15 extend across the discharge portions of the hoppers 11 in communication with the interior of each hopper and form a part of the hopper discharge devices 14. The conduit 15 is formed with opposite end sections including sections 16 which extend upwardly in parallel relation with converging end wall sections of the endmost hoppers 11 to a position above the wheel trucks of the car 10 identified in location by the schematically illustrated wheels 13. The sections 16 terminate in horizontally directed material discharge end sections 17 which are suitably fixedly mounted in exposed relation in the end structures 18 of the car 10. Each conduit end section 17 is provided with a removable closure assembly 19 of known type permitting ready exposure of opposite ends of the material discharge conveyance system for selective suction hose attachment or air intake for simultaneous material discharge from the longitudinally aligned and interconnected hoppers 11.

The material discharge conveyance system described may be utilized for hopper car unloading from either end or both ends simultaneously. The conduit end sections 17 are protected during car operation providing ample clearance for wheel truck movement and being positioned for waist-high hose connection readily accessible either from car level or from platform level. The accessible outlets are away from the bottom of the car thereby improving sanitation and working conditions during unloading. The number of outlets requiring car seals is minimized to prevent contamination or pilferage. To further improve sanitation conditions, the system of the present invention may also include special air vent means forming a part of the hopper construction and of a nature to be described, such vent means eliminating the necessity of the removal of the conventional hatch covers 20 carried on the top portion of the car 10 and covering hatch openings used in loading the parallel series of longitudinally aligned hoppers 11.

FIG. 2 illustrates certain structural details of the hopper discharge device 14 of the type illustrated in use in the car 10 of FIG. 1. This device includes the use of the conduit 15 in forming the bottom wall section of each hopper 11 by extending across the bottom portion of the discharge end 12 of each hopper and being attached to the converging wall sections thereof. The top wall portion of each conduit portion 15 is formed with a pair of longitudinally extending slot-like material receiving openings 21 which are located in close association with adjacent converging wall sections 12. The intermediate top portion 22 of the conduit 15 extends upwardly into a hopper 11 and, in effect, functions as an arcuate baffle means between the material receiving openings 21. Thus, when suction is applied to a conduit 15 and the material receiving openings 21 are uncovered to permit the flow of material from the hopper 11 into the conduit 15, the area immediately below the arcuate baffle portion 22 does not become filled with material and defines an air space above the material for the movement of air therethrough to pick up the material and deliver the same along the conduit 15.

To control the delivery of material from each hopper 11 into the section of conduit 15 forming the bottom closure portion of the hopper, a suitable valving arrangement of the type illustrated in FIG. 2 may be used. This arrangement in each hopper discharge portion 12 includes a pair of arcuate shoe-like valve plates 23 which are longitudinally coextensive with the material receiving openings 21 and which have secured thereto resilient gaskets 24 which engage the conduit 15 in overlying closing relation with the openings 21. Each valve plate 23 is formed with an upstanding plate portion 25 which at opposite ends thereof projects beyond the arcuate plate 23 and is received between pairs of guide plates 26 suitably attached to opposite converging wall sections 12 of a hopper. Each plate portion 25 has attached thereto a vertically directed operating rod 27 which at opposite ends thereof is formed with clevis portions 28. The lowermost clevis portion is attached by a fastener 29 to the upstanding plate portion 25 of a valve plate and the uppermost clevis portion 28 is attached by a fastener 30 to a rocker arm 31 fixedly carried on a transversely extending operating rod 32. A sleeve guide 33 is fixedly mounted in the hopper 11 by a transverse plate 34 attached to converging wall sections 12 of the hopper. The rods 27 reciprocate in their respective sleeves 33 in response to rotation of the operating rods 32.

FIG. 2 illustrates transversely aligned hoppers 11 with each hopper being provided with separate valve means operated by a separate rod 32 extending transversely across the interior of the car 10. Opposite ends of each of the rods 32 project outwardly of the side walls 35 of the car and are journaled through mounting plates 36 and are formed with flat sided projecting operating ends 37 to which a known type of crank or wrench means may be attached to rotate the rods 32. FIGS. 3–5 illustrate one form of operating mechanism accessible from opposite sides of the car 10. The outwardly projecting rod ends 37 may have attached thereto a fixed lock plate 38 having a pair of apertures 39 therein. To one side of the rod mounting portion 36 is a generally L-shaped member 40 which extends over the apertures 39 of the lock plate 38 and which has received therethrough a movable lock pin 41 which is insertable in one of the apertures 39. FIG. 3 might represent the position of the lowermost operating rod 32 in the left hand portion of FIG. 2 with the valve elements 23 in closing engagement over the slots 21 of the conduit 15. The pin 41 is used to lock the lowermost rod 32 in place to prevent delivery of material from the hopper 11 into the conduit 15. FIG. 4 can represent the position of the uppermost rod 32 as viewed in FIG. 2, this rod carrying the valve elements 23 illustrated at the left of FIG. 2 with the valve elements being raised from association with the material receiving openings 21 of the conduit 15. The lock pin 41 of FIG. 4 holds the operating rod 32 associated therewith in the valve open position during the delivery of material from the hopper 11 into the conduit 15.

The valve operating rods 32 are accessible from either side of the car 10 to accommodate selective unloading of any one of the hoppers 11 thereof. The provision of a pair of rods 32 extending through each pair of transversely aligned hoppers provides complete selectivity with regard to specified hopper unloading. Again, such selectivity is available from either side of the car 10. If desired, a single operating rod 32 may be used with each pair of transversely aligned hoppers being simultaneously unloaded. The operating end portions 37 of the rods 32 are readily accessible from ground level as well as platform level.

FIGS. 6–8 illustrate one form of gravity discharge means which form a part of each portion of the conduit 15 constituting the bottom wall section of a hopper 11. With particular regard to FIG. 6, it will be noted that each slot-like opening 21 is of substantial width and extends continuously throughout substantially the entire length of the portion of the conduit 15 in the hopper 11. The provision of a pair of such openings provides adequate area for efficient material delivery into the conduit 15 either for movement longitudinally of the conduit or for gravity discharge in the manner to be described. The gravity discharge arrangement includes the provision of a substantial bottom opening 42 formed in the portion of the conduit 15 extending across the bottom of each hopper 11. The bottom opening 42 may be defined by a removed plate section 43 which is attached to and forms a part of an arcuate drop gate or closure 44 provided with a pair of hinge members 45 pivotally attached to cooperating hinge members 46 by a suitable fastener 47, the hinge members 46 being fixedly carried along the outer surface of the portion of the conduit 15 in association with a hopper 11. To each side of the removed plate section 43 is mounted a resilient gasket 48 which engages the outer surface portions of the conduit 15 to seal off the opening as best shown in FIG. 7. At least a pair of locking ears 49 are mounted on the closure 44, and have pivotally attached thereto a locking clamp 50 of any suitable type which engages a bifurcated lock plate 51 fixedly carried on the outer surface of the conduit 15. Operation of the gravity discharge arrangement between closed and open positions is illustrated in FIGS. 7 and 8. With this arrangement, selective gravity discharge of single hoppers of the car 10 may be carried out without utilization of the basic pneumatic material conveyance system previously described.

Figure 9:
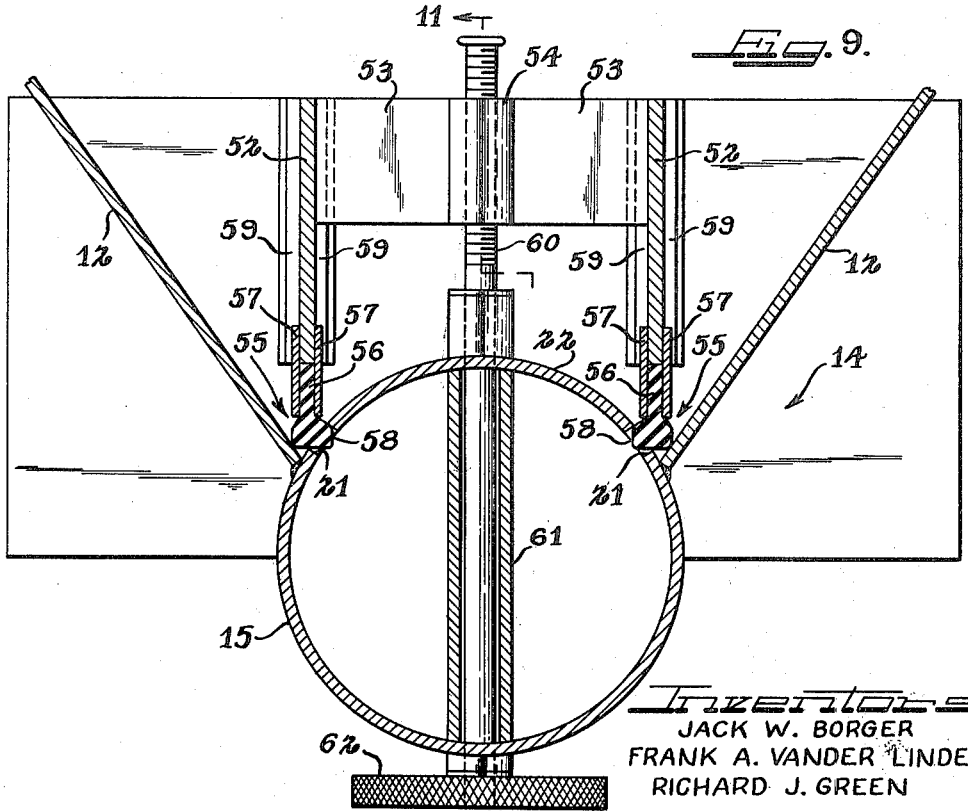
FIG. 9 is a fragmentary transverse section of the hopper discharge device of FIG. 2 illustrating the use therewith of a modified valving means.

FIGS. 9–13 illustrate a modified valve assembly which is operated from the bottom of the conduit 15 externally thereof. This valve assembly includes a reciprocating frame formed from a pair of spaced valve plates 52 interconnected by diagonally extending bracing plates 53 which centrally of the assembly are fixedly attached to an internally threaded sleeve 54. The bottom edges of the plates 52 have attached thereto depending valve elements 55 which as best shown in FIGS. 9 and 10 include attaching neck portions 56 received between attachment and rigidifying plates 57 and depending exposed block-like sealing portions 58 adapted to engage the conduit 15 in covering relation with the slot-like openings 21 or actually be partially received in such openings as shown in FIG. 9. Opposite ends of the plates 52 are slidably received between guide plate portions 59 fixedly carried on the inner surfaces of the oppositely positioned wall sections of the hopper.

The internally threaded sleeve 54 has received therethrough the upper thereaded end of a jack screw 60 which extends downwardly through a sleeve portion 61 projecting through the top baffle plate portion 22 of the conduit 15. The sleeve 61 extends vertically downwardly through the conduit 15 and through a suitable opening in the bottom thereof to project downwardly therefrom to place the handle portion 62 of the jack screw in exposed pending relation externally of the conduit 15. The central portion of the sleeve 61 as best shown in FIG. 13 is preferably of generally oval configuration to present streamlined surfaces in a direction longitudinally of the conduit 15 to offer the least possible resistance to material flow through the conduit 15. As previously described, a plurality of hoppers may be unloaded simultaneously through the conduit 15 and material from an adjacent hopper must move past the sleeve 61 toward the discharge end of the system. Operation of the jack screw 60 by rotation of the handle 62 will result in the raising and lowering of the valve assembly between the positions illustrated in FIGS. 9 and 10 to open and close the material receiving openings 21 of the conduit 15.

FIGS. 14–17 illustrate one form of hopper venting arrangement useful with the present invention. All of the transversely paired and longitudinally aligned hoppers 11 of the car 10 may be in communication with one another above the bottom discharge devices 14 thereof or may be separately isolated from one another by various wall structures. Such arrangements are well known and are not illustrated in detail in the accompanying drawings. If the hoppers are individually isolated, venting arrangements must be provided for each hopper. Accordingly, a venting arrangement in association with only one hopper is illustrated for purposes of description. The hopper 11 is provided near the top thereof with a vertical wall section 63 extending between the side walls 35 of the car 10. The vertical wall section 63 is provided with a vent opening 64 which is in communication with a vent tube 65 mounted externally of the hopper. The vent tube 65 of FIGS. 14 and 15 is illustrated as extending vertically downwardly from the top portion of the hopper 11 and at the lowermost end thereof is provided with a transversely extending portion 66 which extends through a side wall 35 of the car 10. The end of the transverse portion 66 projects outwardly of the car and is provided with a removable cover means 67 which is readily accessible to an operator. Preferably, the uppermost end of the tube 65 which is in communication with the hopper 11 extends upwardly to a point just below the top plate structure 68 of the car 10 to be positioned above the material stored in the hopper 11.

More preferably, a trough-like baffle member 69 as shown in FIG. 16 is used with the vent tube 65 of FIGS. 14 and 15. The baffle member 69 opens upwardly in close association with the top plate portion 68 and is of cup-like configuration to prevent the accumulation of material in the hopper around the vent opening 64 to permit ready introduction of air into the hopper. The arrangement of FIGS. 16 and 17 merely includes a short vent tube 65′ which terminates immediately outwardly of the vertical wall section 63 and across the bottom opening thereof is formed with a screen 70 as shown in FIG. 17. This screen functions to prevent the introduction of foreign matter into the hopper 11 and may be used at the end of the transverse tube section 66 of the arrangement of FIGS. 14 and 15 if desired.

FIGS. 18 and 19 illustrate a modified venting arrangement which includes a cover plate 71 extending downwardly across a vent opening 72 formed in the vertical wall section 63 of a hopper 11. The plate 71 along the top marginal portion thereof is fixedly secured to a transverse hinge pin 73 which extends between spaced ears 74 fixedly carried on the wall section 63. The pin 73 is pivotally supported by the ears 74 and the cover plate 71 pivots along an upwardly directed arcuate path toward and away from the vent opening 72. Suitable gasket strips 75 are carried on the plate 71 to seal off the opening 72. A screen section 76 preferably covers the opening 72 externally of the hopper and an upwardly opening trough-like member 77 aids in protecting the screen 76 from damage.

Inwardly of the hopper 11 in surrounding relation with the opening 72 and cover plate 71, an upwardly opening trough-like member 78 is mounted in close association with the top plate portion 68 of the car 10. The trough 78 includes spaced side plates and an inclined interconnecting end plate 79 which cooperatively prevent the material in the hopper from accumulating against the plate 71 and thus interferring with pivotal operation thereof. During discharge of material from the hopper 11 through the pneumatic conveyance system of the type previously described, a differential pressure is created between the interior of the hopper and atmospheric pressure externally of the car. This pressure differential will result in the upward swinging of the cover plate 71 thus permitting the introduction of air into the car through the screened opening 72. A suitable counterweight 80 may be carried on the inner surface of the cover plate 71 to assure positive return of the same in opening covering relation when pressure equalization occurs. The arrangement described establishes a positive sealing automatic vent and is of complicated design and functioning.

With automatic hopper venting of the type described, it is unnecessary to remove the hatch covers 20 of the car 10 during material unloading. This operational aspect not only reduces unloading time and costs but also virtually eliminates the possibility of material contamination during unloading. Utilization of one of the venting arrangements with the closed pneumatic material conveyance system including the conduit 15 described above establishes a completely closed material unloading operation fully protecting the material from contamination or from the damaging effects of adverse weather conditions during unloading.

Figure 20:
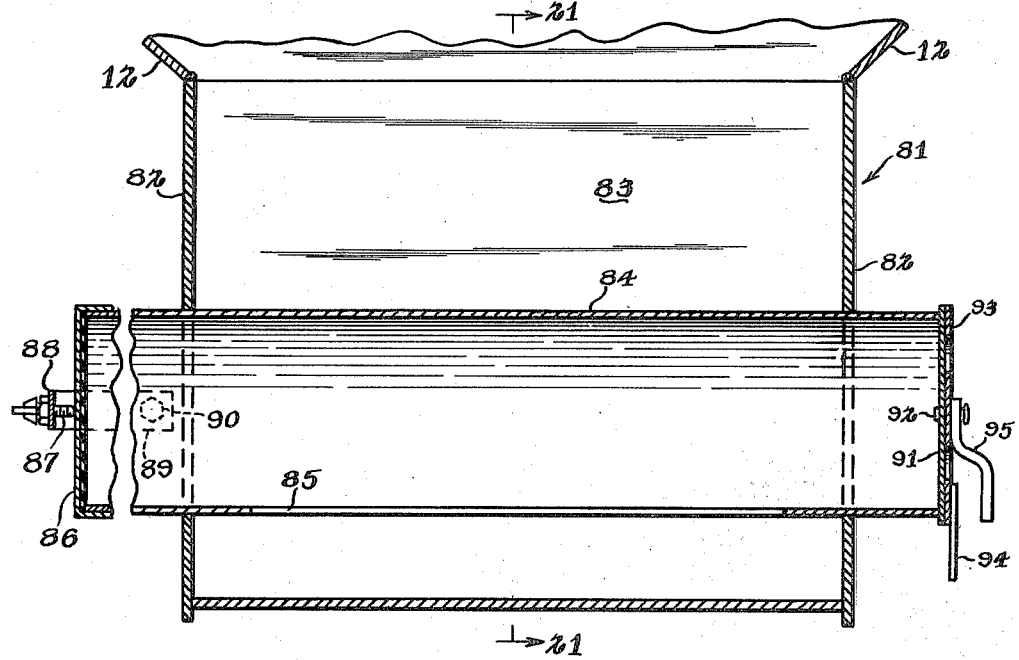
FIG. 20 is a fragmentary longitudinal section of another form of hopper discharge device.
Figure 21:
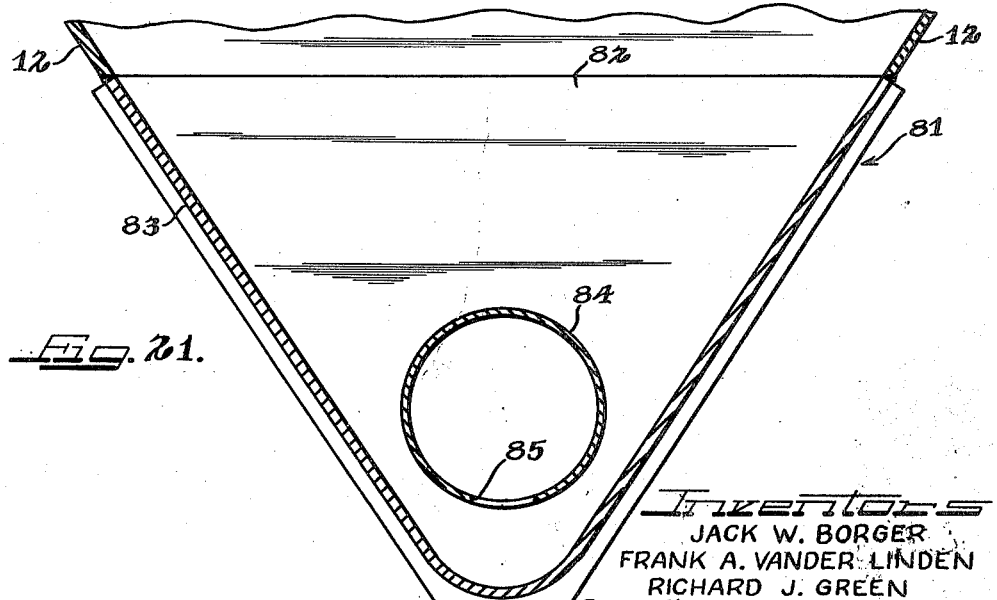
FIG. 21 is a fragmentary transverse section of the device of FIG. 20 as viewed generally along line 21—21 therein.

FIGS. 20 and 21 illustrate the type of hopper discharge device which makes use of a cylindrical material discharge conduit means extending through the hopper discharge end portion, the portion of the conduit means which is within the hopper discharge end portion being spaced above the bottom wall section of the discharge end portion and being spaced from the converging side wall sections thereof to receive material thereabout. Several modifications of such an arrangement will be described particularly in conjunction with special valving means forming a part thereof. Basically, pneumatic discharge of material from the hopper occurs as a result of air flow through the conduit means with the material accumulated below the portion of the conduit means in the discharge end of the hopper being picked up through a longitudinal slot-like material receiving opening located along the bottom surface portion of the conduit means. Each of the modifications to be described are illustrated for use in conjunction with a single hopper 11, the descriptions being limited to single hopper discharge. However, it will be understood that the cylindrical conduit means forming a part of the various devices is readily adapted for incorporation in the single conduit material conveyance system of the type described above.

The hopper discharge device 81 of FIG. 20 is suitably attached to the bottom discharge end portion of the hopper 11 along the bottom edges of the converging wall sections 12. The discharge device includes vertical end plates 82 interconnected by a generally V-shaped trough-like plate member 83 having downwardly converging side wall portions integrally joined with a bottom arcuate wall section. A conduit 84 extends through the vertical end plates 82 and is located within the device 81 to be spaced above the arcuate bottom wall section of the plate 83 and centrally located in spaced relation between the converging side wall portions of the plate 83. Thus material in the hopper 11 is free to flow downwardly under the influence of gravity over the curved top surface portion of the conduit 84 and along the side curved surface portions thereof into the material pick-up area directly below the conduit 84. This conduit is formed with a longitudinally extending slot-like opening 85 which is of substantial width and which extends continuously throughout substantially the entire length of the portion of the conduit 84 received within the discharge device 81.

One end of the conduit 84 externally of the discharge device 81 is provided with a removable closure member 86 which is held in place by a clamp screw 87 carried on a pivotal bracket 88 having leg portions 89 extending inwardly along opposite side portions of the conduit 84 and pivotally attached thereto by stub shaft members 90 fixedly attached to the conduit 84. This type of closure assembly is shown in detail in FIG. 30. The opposite end of the conduit 84 projecting outwardly of the discharge device 81 is provided with an adjustable vent assembly which includes a fixed apertured plate 91 extending across the open end of the conduit 84 and fixedly mounting thereon an outwardly projecting threaded lock bolt 92. A rotatable apertured plate 93 is carried on the bolt 92 outwardly of the fixed plate 91 and has mounted thereon a radially projecting operating lever 94 by means of which the plate 93 may be rotated relative to the plate 91 for selected alignment of apertures therein to control the amount of air vented into the conduit 84. A lock handle 95 having an internally threaded lock nut portion carried on the lock bolt 92 is located outwardly of the plate 93 and upon rotation about the bolt 92 selectively locks and unlocks the plate 93 in fixed relation relative to the plate 91. FIG. 31 illustrates certain features of the venting arrangement described.

In operating the material discharge device 81 of FIGS. 20 and 21, the closure 86 is removed and a suitable suction hose is attached to the conduit 84. The vent assembly at the opposite end of the conduit 84 is adjusted for controlled air delivery therethrough and upon the application of suction, material accumulated below the conduit 84 within the discharge device is picked up in the conduit 84 and removed from the discharge device. Operation of the device is uncomplicated and the material in the hopper is protected against contamination at all times. The simplicity of the discharge device minimizes material damage during discharge thereof.

FIGS. 22 and 23 illustrate the hopper discharge device 81 previously described with the incorporation of valve means therein to provide a positive control of the operation thereof. The valve means are operative between the arcuate side portions of the conduit 84 and the converging wall portions of the V-shaped plate 83. The valving arrangement includes a pair of vertical plates 96 extending between the vertical end plates 82 and received between pairs of guide plates 97 mounted on the end plates 82. The vertical plates 96 along the bottom edges thereof are provided with a transverse valve plate 98 having suitably secured thereto resilient block-like valve elements 99 which are shaped along opposite edges to conform to the arcuate shape of the conduit 84 and the inclined inner surface of the converging side portions of the V-shaped plate 83. The valve elements 99 are dimensioned to extend downwardly between the conduit 84 and the adjacent converging side portions of the plate 83 to seal off the area therebetween and prevent the gravity flow of material down below the conduit 84. Suitable stop blocks 100 are carried along the end plates 82 to aid in limiting the extent to which the valve elements 99 can be forced downwardly along the side of the conduit 84. Any suitable operating means may be used in controlling vertical movement of the plates 96. Rods 101 may be attached along the top edges of the plates 96 and extend upwardly into engagement with transverse operating rods of the type previously described in connection with FIG. 2.

FIGS. 24 and 25 illustrate still another form of valve means operative with the material discharge device 81. In this modification the valve means includes an arcuate shoe portion 102 provided with gasket means 103 for engagement with the bottom surface portions of the conduit 84 along opposite sides of the slot-like opening 85. The shoe 102 is mounted on at least one rod 104 which extends upwardly through the bottom arcuate wall portion of the V-shaped plate 83 through the material accumulation area directly below the conduit 84. FIG. 24 illustrates the use of a pair of operating rods 104 maintained in spaced relation on a pivot rod 105 suitably connected to the rods 104 externally of the discharge device 81. The rods 104 extend through packings 106 suitably retained in a packing housing 107 fixed to the outer surface of the plate 83.

The rod 105 has attached thereto an operating lever 108 which is pivotally mounted on a pin 109 between outwardly projecting plates 110 fixed to the outer surface of the V-shaped plate 83 of the discharge device 81. As shown in FIG. 25, the lever 108 will operate between valve opening and closing positions with the valve shoe 102 moving away from or toward the conduit 84. The plates 110 may be provided with an aperture 111 therein through which a lock pin 112 may be received in overlying edge engagement with a portion of the lever 108 to hold the same in valve closing position. When the valve mechanism described is open, material accumulates between the valve shoe 102 thereof and the conduit opening 85 and is picked up through the conduit opening 85 for discharge through the conduit 84.

FIGS. 26 and 27 illustrate a further modified form of hopper discharge device 113 which has as a part thereof a specially designed alternative gravity discharge arrangement. The device 113 is formed from converging wall sections 114 and 115 which at the bottom of the device define with one another a sharp V-shaped configuration. The bottom edge of the wall section 114 is provided with a longitudinally extending angle brace 116 receiving thereagainst a hook-like rim 117 attached along the lowermost edge of a drop gate 118 which, in effect, forms a continuation of the wall section 115 and is received in a gravity discharge opening 119 formed in the wall section 115. The gate 118 along the opposite upper edge thereof has fixedly secured thereto a pair of spaced hinge plates 120 which extend about and over a longitudinal rim strip 121 which is in engagement with an angle brace 122 fixedly secured on the wall section 115. The hinge plates 120 are attached by hinge pins 123 to fixed clevis-type hinge plate members 124 fixedly carried along the outer surface of the wall section 115.

A cylindrical material discharge conduit 125 extends through the discharge device 113 in spaced relation to the converging side wall sections and the bottom portion of the device in the manner previously described. The bottom surface of the conduit 125 is provided with a longitudinally continuous material receiving slot 126 through which material is delivered into the conduit 125 during pneumatic unloading. For gravity discharge, the plate 118 is swung downwardly with the edge of the angle brace 122 in engagement with a surface portion of the rim strip 121 providing a pivot point in conjunction with the hinge pins 123 and gravity discharge occurs through a converging side wall section of the device. In the closed condition of the plate 118, the edge of the angle brace 122 engaging the interior of the rim strip 121 functions as a seal to prevent loss of material therethrough. Similarly, the edge of the angle brace 116 engaging an inner surface portion of the rim strip 117 prevents loss of material. Any suitable means, such as a conventional car seal (not shown), may be used in locking the plate 118 in place.

In describing the use of a cylindrical conduit portion as the bottom wall section of a hopper discharge device in conjunction with FIG. 2 above, the top wall portion 22 of the conduit 15 has been referred to as a baffle means. Such a baffle means is capable of establishing an air space below the same to provide for efficient material movement longitudinally of the conduit. The arrangements described above wherein the conduit actually extends through the discharge device in spaced relation to the inner wall surfaces thereof provide baffle action by reason of the top arcuate portions of the conduit functioning as baffle means. In this respect, the material delivered up into the conduit from the bottom area of the discharge device does not completely fill the conduit thus leaving an air space. Other arrangements utilizing special forms of baffle means may be used.

FIGS. 28 and 29 illustrate a special baffle means used in a discharge device 127. This device includes vertical end walls 128 joined with converging side walls 129 which are closed off along the bottom edges thereof by attachment with a semi-cylindrical portion of a material discharge conduit 130. A top section of the conduit 130 is removed to, in effect, receive therein the bottom edges of the combined wall sections 128 and 129, the conduit being suitably fixedly attached thereto to close off the hopper discharge device 127. This device may be removably attached to the converging wall sections 12 of a hopper through any suitable means such as cooperating radially directed flanges 131 and 132 receiving therebetween gasket strips 133 and fasteners 134. The lowermost edges of the vertical end plates 128 received within the conduit 130 extend downwardly below the original bottom edges of the converging wall sections 129. To these latter bottom edges, vertical plates 135 are suitably attached, these plates extending into attachment with the depending bottom marginal portions of the end plates 128. The plates 135 are spaced inwardly of the side portions of the conduit 130 and define therebetween longitudinally continuous air spaces for the flow of air during the discharge of material from the hopper through the conduit 130. Thus the longitudinal plates 135 function as baffle plates in conjunction with the bottom edge portions of the end plates 128 and side plates 129 received within the conduit 130 to establish air spaces to either side thereof. Opposite ends of the conduit 130 projecting beyond the end plates 128 are provided with the removable closure 86 previously described and the adjustable air vent including the apertured plates 91 and 93, similar reference numerals being used as indicated in FIG. 20 and FIGS. 30 and 31.

Figure 32:
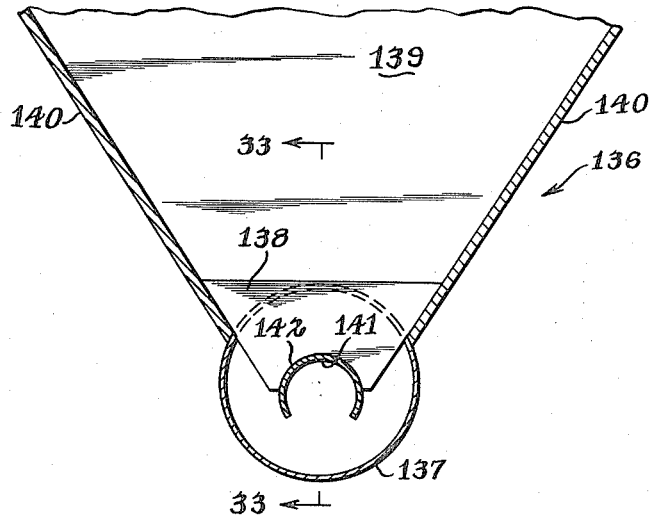
FIG. 32 is a fragmentary transverse section of another modified form of hopper discharge device.
Figure 33:
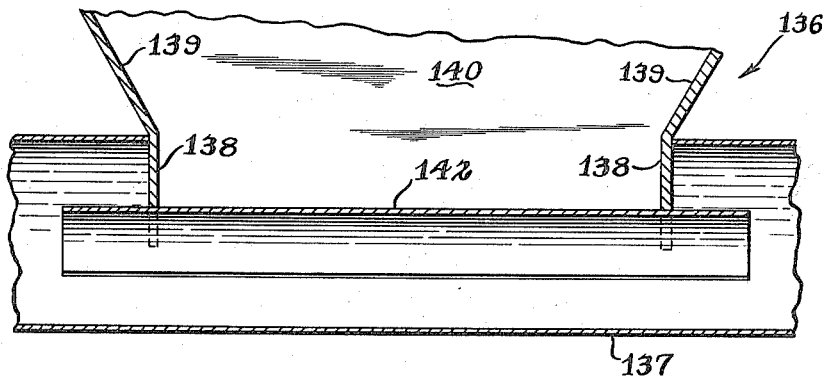
FIG. 33 is a fragmentary longitudinal section of the device of FIG. 32 as viewed generally along line 33—33 therein.

FIGS. 32 and 33 illustrate still another form of baffle arrangement in a hopper discharge device 136 of the present invention. This device includes a cylindrical conduit 137 constituting the bottom wall section of the discharge device 136 and receiving thereinto along the top thereof longitudinally spaced, vertical wall sections 138 which form a continuation of converging end plates 139 connected with converging side plates 140. The plate sections 138 extend substantially downwardly into the conduit 137 and along the bottom edge thereof are formed with concave recesses 141 receiving therein a longitudinally extending arcuate baffle plate 132 which is centrally located in the conduit 137. The upper surface of the baffle plate 142 provides for controlled delivery of material downwardly along the curved side wall portions thereof into the lower portion of the conduit 137. The interior of the baffle plate 142 provides an air space permitting the flow of air through the conduit 137 at the point of material introduction thereinto to maintain proper pneumatic flow of material throughout the entire length of the conduit 137. The depending plate portions 138 need not necessarily be continuous throughout, suitable baffle plate support means of web-like configuration being appropriate for use.

Figure 34:
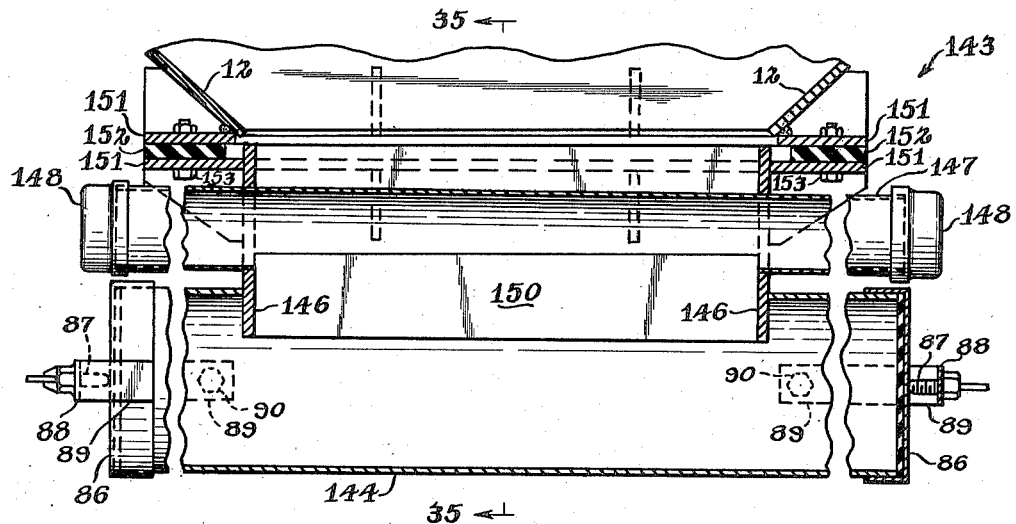
FIG. 34 is a fragmentary longitudinal section of still another form of hopper discharge device.
Figure 35:
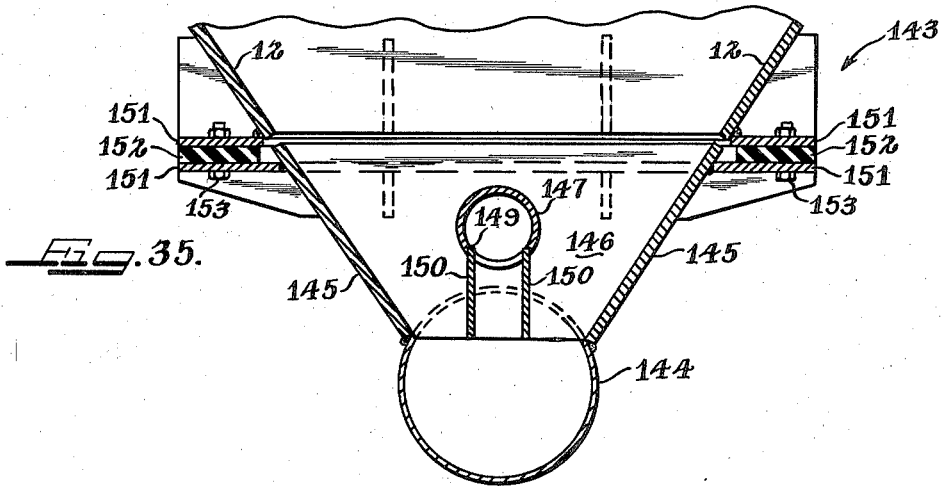
FIG. 35 is a fragmentary transverse section of the device of FIG. 34 as viewed generally along line 35—35 therein.

FIGS. 34 and 35 illustrate still another form of material discharge device 143 including as a part thereof a separate air vent in the form of baffle means operatively associated with a bottom closing material discharge conduit means. The device 143 includes a discharge conduit 144 attached to converging side wall sections 145 closed off at the ends thereof by vertical end plates 146. Mounted through the end plate portions 146 above the conduit 144 is an air pipe 147 which projects outwardly of the end plate portions 146 and is provided at opposite ends with removable caps 148. The bottom portion of the air pipe 147 intermediate the end wall portions 146 is formed with a longitudinally extending opening 149 of substantial width having attached along opposite edges thereof a pair of vertical plates 150. The plates 150 extend between the end wall sections 146 and project downwardly into the conduit 144. The portion of the pipe 147 received within the device 143 and the vertical plates 150 cooperatively define an inverted trough-like air vent mounted above the conduit 144 and in communication therewith.

The discharge device 143 is attached to the discharge end of a hopper by means of cooperating radial flanges 151 receiving therebetween gasket strips 152 and interconnected by fasteners 153. Opposite exposed ends of the conduit 144 are provided with removable closure assemblies including closure members 86 of the type previously described. In the operation of the device, one of the closure members 86 is removed from the conduit 144 and a suction hose attached thereto. One or more of the caps 148 may be removed from the air tube 147 and upon the application of suction through the conduit 144, air is drawn through the tube 147 and downwardly between the vertical plates 150 into the conduit 144 for efficient discharge of material therefrom.

The material discharge devices described above which make use of the relatively short conduits having removable closures and/or adjustable air vents at opposite ends thereof are particularly adapted for use in hopper cars wherein it is desired to maintain separation between hopper storage areas. By way of example, a car may be divided into three main hopper areas having a single discharge device for each area with the discharge conduit thereof extending transversely of the car. In this manner, different types of materials may be delivered in a single car and efficient discharge means for each separate area of the car is provided.

Obviously certain modifications and variations of the invention as hereinbefore set forth may be made without departing from the spirit and scope thereof, and therefore only such limitations should be imposed as are indicated in the appended claims.

We claim:

1. In a hopper car having a hopper formed with downwardly converging wall sections defining a material discharge portion, the provision of pneumatic material discharge conduit means extending through said hopper discharge portion with at least a part of said conduit means being located within said hopper discharge portion for direct contact with material therein, said part being of arcuate configuration to externally baffle the downward flow of material transversely thereof during discharge of said material, said conduit means including at least one slot-like opening longitudinally thereof in communication with the interior of said hopper to receive material for discharge from said hopper, said part being arranged to direct said material toward said opening, and mechanically reciprocable valve means in said hopper, said valve means including at least one valve member movable through material in said hopper into engagement with said conduit means to close off said opening to limit material discharge therethrough into said conduit means independent of the presence of material in said hopper, and valve member operating means extending through said hopper for access thereto externally of said hopper to move said valve member toward and away from said conduit means for total unimpeded use of said opening during discharge of material from said hopper, said operating means including valve member selective positioning means.

2. In a hopper car having a hopper formed with downwardly converging wall sections defining a material discharge portion, the provision of pneumatic material discharge conduit means extending through said hopper discharge portion with at least a part of said conduit means being located within said hopper discharge portion for direct contact with material therein, said part being of arcuate configuration to externally baffle the downward flow of material transversely thereof during discharge of said material, said conduit means including at least one slot-like opening longitudinally thereof in communication with the interior of said hopper to receive material for discharge from said hopper, said part being arranged to direct said material toward said opening, and mechanically vertically reciprocable valve means in said hopper, said valve means including at least one valve member movable through material in said hopper into engagement with said conduit means to close off said opening to limit material discharge therethrough into said conduit means independent of the presence of material in said hopper, and valve member operating means extending vertically through said hopper in normal relation to the longitudinal axis of said conduit means for access thereto externally of said hopper to move said valve member toward and away from said conduit means for total unimpeded use of said opening during discharge of material from said hopper, said operating means including valve member selective positioning means.

3. The hopper car of claim 1 wherein said conduit means defines the bottom wall section of said discharge portion with a top portion thereof projecting into said discharge portion to define said arcuate part, said top portion including a pair of transversely spaced slot-like openings adjacent the converging wall sections of said hopper, said valve means being in the form of a reciprocating assembly mounted above said conduit means in said hopper and including downwardly projecting valve members aligned with said openings for movement into and out of closing engagement therewith.

4. The hopper car of claim 2 wherein said conduit means defines the bottom wall section of said discharge portion with a top portion thereof projecting into said discharge portion to define said arcuate part, said top portion including a pair of transversely spaced slot-like openings adjacent the converging wall sections of said hopper, said valve means being in the form of a reciprocating assembly mounted above said conduit means in said hopper and including downwardly projecting valve members aligned with said openings for movement into and out of closing engagement therewith.

5. The hopper car of claim 2 wherein said conduit means defines the bottom wall section of said discharge portion with a top portion thereof projecting into said discharge portion to define said arcuate part, said top portion including a pair of transversely spaced slot-like openings adjacent the converging wall sections of said hopper, said valve means being in the form of a reciprocating assembly mounted above said conduit means in said hopper and including downwardly projecting valve members aligned with said openings for movement into and out of closing engagement therewith, and transversely extending drive means engaged with said assembly in said hopper, said drive means being exposed on opposite sides of said hopper for access thereto externally of said hopper car.

6. The hopper car of claim 2 wherein said conduit means defines the bottom wall section of said discharge portion with a top portion thereof projecting into said discharge portion to define said arcuate part, said top portion including a pair of transversely spaced slot-like openings adjacent the converging wall sections of said hopper, said valve means being in the form of a reciprocating assembly mounted above said conduit means in said hopper and including downwardly projecting valve members aligned with said openings for movement into and out of closing engagement therewith, and vertically extending drive means engaged with said assembly in said hopper, said drive means extending downwardly through said conduit means below said hopper for access thereto externally of said hopper car.

7. The hopper car of claim 2 wherein said conduit means defines the bottom wall section of said discharge portion with a top portion thereof projecting into said discharge portion to define said arcuate part, said top portion including a pair of transversely spaced slot-like openings adjacent the converging wall sections of said hopper, said valve means being in the form of a reciprocating assembly mounted above said conduit means in said hopper and including downwardly projecting valve members aligned with said openings for movement into and out of closing engagement therewith, and gate means formed in the bottom portion of said conduit means externally of said hopper for gravity discharge of material from said hopper.

8. The hopper car of claim 1 wherein said conduit means is fully received in said discharge portion in vertically spaced relation to a bottom wall portion of said hopper, said opening being formed in the bottom surface area of said conduit means in opposed relation to said bottom wall portion, said valve means being in the form of a reciprocating assembly mounted above said conduit means in said hopper and including downwardly projecting and transversely spaced valve members aligned for movement into and out of discharge portion closing engagement with opposed surface areas of said converging wall sections and conduit means.

9. The hopper car of claim 2 wherein said conduit means is fully received in said discharge portion in vertically spaced relation to a bottom wall portion of said hopper, said opening being formed in the bottom surface area of said conduit means in opposed relation to said bottom wall portion, said valve means being in the form of a reciprocating assembly mounted above said conduit means in said hopper and including downwardly projecting and transversely spaced valve members aligned for movement into and out of discharge portion closing engagement with opposed surface areas of said converging wall sections and conduit means.

10. The hopper car of claim 2 wherein said conduit means is cylindrical and is fully received in said discharge portion in vertically spaced relation to a bottom wall portion of said hopper, said opening being formed in the arcuate bottom surface area of said conduit means in opposed relation to said bottom wall portion, said valve means being in the form of a reciprocating assembly extending through said bottom wall portion in opposing relation with said opening, the valve member of said assembly and said bottom wall portion being of substantially corresponding arcuate configuration for substantial mating of said valve member with said conduit means in closing relation with said opening and in retracted relation with said bottom wall portion.

References Cited by the Examiner
UNITED STATES PATENTS

| | | | |
|---|---|---|---|
| 2,030,553 | 2/36 | Tiley | 302—53 |
| 2,650,726 | 9/53 | Aller | 302—52 |
| 2,919,158 | 12/59 | Aller | 302—52 |
| 3,048,448 | 8/62 | Aller | 302—52 |
| 3,048,449 | 8/62 | Aller | 302—52 |
| 3,088,776 | 5/63 | Aller | 302—52 |

SAMUEL F. COLEMAN, *Primary Examiner.*
ANDRES H. NIELSEN, *Examiner.*